United States Patent
Roszman

(10) Patent No.: US 9,826,675 B2
(45) Date of Patent: Nov. 28, 2017

(54) GAUGE WHEEL ASSEMBLY WITH HINGE

(71) Applicant: CNH Industrial America LLC, New Holland, PA (US)

(72) Inventor: Joshua J. Roszman, La Rue, OH (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/748,408

(22) Filed: Jun. 24, 2015

(65) Prior Publication Data

US 2016/0374257 A1    Dec. 29, 2016

(51) Int. Cl.
*A01B 63/16* (2006.01)
*A01C 5/06* (2006.01)

(52) U.S. Cl.
CPC .............. *A01C 5/064* (2013.01); *A01B 63/16* (2013.01); *A01B 63/163* (2013.01); *A01B 63/166* (2013.01)

(58) Field of Classification Search
CPC combination set(s) only.
See application file for complete search history.

(56) References Cited

U.S. PATENT DOCUMENTS

| | | | |
|---|---|---|---|
| 2,791,875 A * | 5/1957 | Faas ...................... | A01D 34/84 172/14 |
| 2,884,080 A | 12/1959 | Reaves | |
| 3,153,310 A * | 10/1964 | Allen ..................... | A01D 34/28 56/322 |
| 4,520,876 A | 6/1985 | Peterson et al. | |
| 4,594,951 A | 6/1986 | Grataloup | |
| 5,235,922 A | 8/1993 | Deckler | |
| 5,269,380 A | 12/1993 | Lofquist et al. | |
| 5,297,497 A | 3/1994 | Schmidt | |
| 5,409,069 A | 4/1995 | Hake | |
| 5,427,038 A | 6/1995 | Ege | |
| 5,477,930 A * | 12/1995 | Degelman ............. | A01B 63/22 172/386 |
| 5,595,130 A | 1/1997 | Baugher et al. | |
| 5,904,107 A | 5/1999 | Kester | |
| 6,321,667 B1 | 11/2001 | Shoup | |
| 6,325,156 B1 | 12/2001 | Barry | |

(Continued)

FOREIGN PATENT DOCUMENTS

| | | |
|---|---|---|
| WO | WO2008022373 | 2/2008 |
| WO | WO2013101796 | 7/2013 |

OTHER PUBLICATIONS https://jd.parts.deere.com/partsmkt/.../DKD1661PlanterPartsGuide.pdf?.

(Continued)

*Primary Examiner* — Alicia Torres
(74) *Attorney, Agent, or Firm* — Rebecca L. Henkel; Rickard K. DeMille

(57) ABSTRACT

A hinge for a gauge wheel arm for movably swinging the gauge wheel away from the agricultural equipment, such as an agricultural planter, is disclosed. The hinge is located along the length of the gauge wheel arm for rotating the gauge wheel away from the agricultural equipment to expose an inner surface of the gauge wheel and an interior portion of the agricultural equipment. The gauge wheel arm rotates about an angle of rotation formed by the hinge and permitting rotation between 0 and 180 degrees. The gauge wheel arm may also include a lock bolt for preventing rotation of the gauge wheel when desired.

15 Claims, 6 Drawing Sheets

(56) References Cited

U.S. PATENT DOCUMENTS

| | | | |
|---|---|---|---|
| 6,644,223 B2 | 11/2003 | Prairie et al. | |
| 7,204,319 B2 * | 4/2007 | Hoehn | A01B 73/044 |
| | | | 172/311 |
| 7,360,494 B2 | 4/2008 | Martin | |
| 7,481,278 B1 | 1/2009 | Pomedli et al. | |
| 7,640,874 B2 * | 1/2010 | Hoehn | A01B 49/06 |
| | | | 111/66 |
| 8,291,997 B2 | 10/2012 | Kovach et al. | |
| 8,342,108 B2 | 1/2013 | Schilling et al. | |
| 8,387,715 B2 | 3/2013 | Rylander | |
| 2003/0177747 A1 * | 9/2003 | Lundstom | A01B 73/005 |
| | | | 56/229 |
| 2005/0072344 A1 | 4/2005 | Kester | |
| 2009/0100817 A1 * | 4/2009 | Godfrey | A01D 34/662 |
| | | | 56/15.6 |
| 2011/0000410 A1 * | 1/2011 | Manasseri | A01O 5/064 |
| | | | 111/163 |
| 2012/0192775 A1 * | 8/2012 | Manasseri | A01C 5/064 |
| | | | 111/163 |

OTHER PUBLICATIONS http://www.rkproducts.com./gwapk.htm.
http://www.shoupparts.com/GWK1705/.
http://greenly.en.hisupplier.com/product-1090438-APQ2550-2B-Gauge-Wheel-Arm-kit-for-all-John-Deere-planters.html.

* cited by examiner

GAUGE WHEEL ASSEMBLY WITH HINGE

FIELD OF THE INVENTION

This invention relates generally to agricultural product application equipment, and in particular, a gauge wheel assembly of an agricultural planter that includes a hinge for allowing the gauge wheel to pivot away from the agricultural planter for service and maintenance.

BACKGROUND OF THE INVENTION

Conventional agricultural planters are often employed to deposit planting material into soil. Many planters include a material dispensing implement that is towed behind a tractor or similar vehicle for distributing planting material, such as seed, fertilizer, pesticide, and other chemicals and materials, onto a furrowed farmland or similar planting surface. The implement may consist of multiple dispensing units that are supported by a common or shared frame that is towed by the tractor. The dispensing units, commonly referred to as row units, may be grouped into two sets—e.g., a left side set and a right side set.

Efficient crop growth requires that seed be planted in different manners that depend at least in part upon soil conditions, fertilizer employed, seed type and anticipated weather and sun exposure conditions. To this end, a seed planter trench opener disc must be capable of opening a seed trench to a selected depth and accurately placing seeds therein to assure that the seed is in proper contact with the soil.

Existing seed planters include various types of depth adjusting mechanisms to control trench depth. One particularly useful type of depth adjusting mechanism provides gauge wheels that, when in a depth adjusting position, have a bottom wheel surface that generally resides proximate and vertically above the bottom disc edge of an associated trench opener disc. The wheel travels along a field surface and therefore limits disc depth into the soil. In many cases a pair of disc openers are each independently mounted to a dispensing unit which is towed behind a tractor or the like and a separate gauge wheel is mounted to each of the disc openers via an adjustable linkage mechanism so that the vertical height difference between the bottom wheel surface and the bottom disc edge is adjustable. For instance, an exemplary disc-wheel configuration may be adjustable so that the surface-edge difference can be set to between one and five inches.

The gauge wheel runs in relative close proximity to the trench opener disc. In addition to its depth controlling function, for some disc drills, the placement of the gauge wheel close to the trench opener disc also assists in keeping the disc surface clean of soil, mud, or debris buildup. Also, the gauge wheel rides over the soil displaced by the disc as the furrow is being cut to prevent the displaced soil from being thrown.

However, the gauge wheel's close proximity to the trench opener disc is not able to prevent all soil, mud, or debris buildup. Mud and residue is still able to build up on the interior of the gauge wheel and on the trench opener disc during operation due to the gap existing between the gauge wheel and trench opener disc. This mud and residue buildup causes the gauge wheel to become heavy and difficult to remove. Therefore, the gauge wheel must be routinely removed to clean out the buildup. The gauge wheel must also be routinely removed in order to replace high wear items such as the trench opener disc, disk scrapers, firming points and seed shoes.

Therefore, it is desired to provide a gauge arm hinge, which allows a user to rotate the gauge wheel outward from the agricultural equipment for servicing an interior portion of the agricultural equipment and clearing any unwanted residue from the interior, such as the inside of the gauge wheel and the trench opener disc, without removing the gauge wheel entirely.

SUMMARY OF THE INVENTION

Therefore, it is a primary object and feature of the present invention to provide a gauge wheel assembly of an agricultural planter that includes a hinge for allowing the gauge wheel to pivot away from the agricultural planter for service and maintenance.

It is a further object and feature of the present invention to provide a gauge wheel assembly of an agricultural planter that includes a hinge for allowing the gauge wheel to pivot away from the agricultural planter and a lock bolt for selectively retaining the gauge wheel in an operable position when desired by a user.

It is a still further object and feature of the invention to provide a gauge wheel assembly of an agricultural planter that includes a hinge that may be installed on pre-existing seed planters.

In accordance with the present invention, a gauge wheel assembly is provided for an agricultural apparatus. The gauge wheel assembly includes a gauge wheel arm having first and second portions. The first portion of the gauge wheel arm has a first end coupled to the agricultural apparatus and a second end. A second portion of the gauge wheel arm has first and second ends. A gauge wheel is rotatably support on and coupled to the gauge wheel arm. A hinge interconnects the second end of the first portion of the gauge wheel arm to the first end of the second portion of the gauge wheel arm. The second portion of the gauge wheel arm is pivotable on the hinge between a first position wherein the first and second portions of the gauge wheel arm extend along a common axis and a second position wherein the second portion of the gauge wheel arm extends along an axis at an angle to the common axis.

The hinge includes a first hinge plate interconnected to the second end of the first portion of the gauge wheel arm. A second hinge plate is interconnected to the first end of the second portion of the gauge wheel arm. A pivot pin pivotably connects the first and second hinge plates. The first hinge plate includes a hinge passage and the second hinge plate includes a hinge passage. The pivot pin extends through the hinge passages of the first and second hinge plates along a pivot axis generally perpendicular to the common axis.

A lock bolt may be operatively connected to the hinge. The lock bolt is movable between an unlocked position wherein the second portion of the gauge wheel arm is movable between the first and second positions, and a locked position wherein the lock bolt maintains the second portion of the gauge wheel in the first position.

In accordance with a further aspect of the present invention, a gauge wheel assembly of an agricultural apparatus is provided. The gauge wheel assembly includes a foldable arm having a first end operatively connected to the agricultural apparatus and a second end. The arm is foldable about a fold axis between a non-folded position wherein the arm extends along an arm axis and a folded position wherein a first portion of the arm is at an angle less than 180 degrees to a second portion of the arm. A gauge wheel is rotatably mounted to the second end of the arm and a lock bolt is operatively connected to the arm for maintaining the arm in the non-folded position.

A hinge may interconnect the first and second portions of the arm. The hinge includes a first hinge plate operatively connected to the first portion of the arm and a second hinge plate operatively connected to the second portion of the arm. A pin pivotably couples the first and second hinge plates and extends along the fold axis.

The lock bolt may be operatively connected to the hinge or directly or indirectly to the foldable arm. The lock bolt movable between an unlocked position wherein the foldable arm is movable between the non-folded and folded positions and a locked position wherein the foldable arm is maintained in the non-folded position.

In accordance with a still further aspect of the present invention, a gauge wheel assembly is provided for an agricultural apparatus. The gauge wheel assembly includes a gauge wheel arm extending along an axis and including a first end operatively connected to the agricultural apparatus and a second end. A gauge wheel is pivotably connected to the gauge wheel arm. The gauge wheel is movable between a first position adjacent the agricultural apparatus and a second position wherein the gauge wheel is spaced from the agricultural apparatus. A lock bolt is operatively connected to the gauge wheel arm for maintaining the gauge wheel in the first position.

The gauge wheel assembly may also includes a pivotable arm having a first end pivotably coupled to the second end of the gauge wheel arm. The pivotable arm rotatably supports the gauge wheel. The first end of the pivotable arm is pivotably coupled to the second end of the gauge wheel arm by a hinge. The hinge includes a first hinge plate operatively connected to the second end of the gauge wheel arm and a second hinge plate operatively connected to first end of the pivotable arm. A pivot pin pivotably couples the first and second hinge plates. The pivot pin is generally parallel to a plane through which the gauge wheel arm extends. The lock bolt is movable between an unlocked position wherein the first and second hinge plates are pivotable with respect to each other on the pivot pin and a locked position wherein the first and second hinge plates are prevented from pivoting with respect to each other on the pivot pin. In the first position, the gauge wheel lies in a plane parallel to the axis of the gauge wheel arm. In the second position, the plane of the gauge wheel is at an angle of less than 180 degrees to the axis.

Other objects, features, and advantages of the invention will become apparent to those skilled in the art from the following detailed description and accompanying drawing plates. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawing in which like reference numerals represent like parts throughout.

DETAILED DESCRIPTION OF THE DRAWINGS

Figure 1:
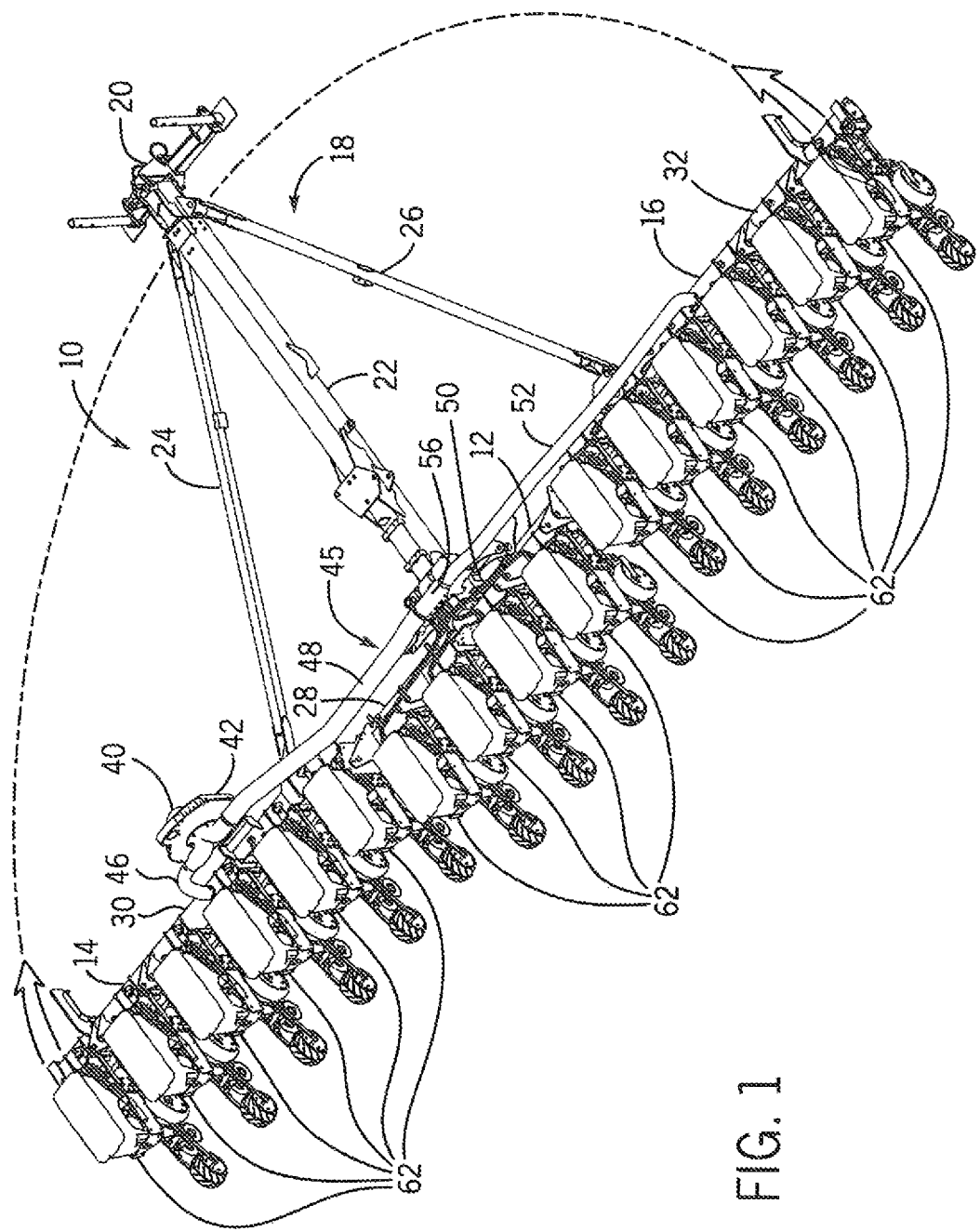
FIG. 1 is an isometric view an exemplary agricultural seed planter having a row unit incorporating a gauge wheel assembly in accordance with the present invention.

Referring now to the drawings, and more particularly to FIG. 1, as known in the art, there is shown an agricultural seed planter or precision planter 10 including a middle section 12, a left section 14, and a right section 16. Each section is coupled to a tow frame 18 having connection point 20 that may be coupled to a tractor or other trailer to facilitate the seeding operation. The illustrated tow frame 18 includes a center beam 22, a left section support beam 24, and a right section support beam 26 extending between the connection point 20 and the middle, the left, the right sections 12, 14, and 16, respectively. In addition, left section 14 and right section 16 are coupled to middle section 12 via a pivot (e.g., a hinge or pin-type) connection which enables the entire frame to flex and follow the terrain more evenly. This arrangement allow for the precision depth control of the seeding operation for each row unit 62 via the relative motion of one of the sections relative to an adjacent section.

The middle section 12, the left section 14, and the right section 16 include corresponding hollow structural members 28, 30 and 32, respectively, that support a plurality of row units 62, as hereinafter described. For example, middle section 12 may include hollow structural member 28, left section 14 may include hollow structural member 30, and right section 16 may include hollow structural member 32. The hollow structural members 28, 30 and 32 may include more than one hollow beams mechanically coupled together to form the section. Furthermore, each hollow beam may have a generally rectangular cross section and include a separate hollow interior, for reasons hereinafter described. It is contemplated for the hollow structural members 28, 30 and 32 to be fabricated from any suitable structural material, such as metal, structural steel or a combination thereof. The structural material may also be fabricated from other materials, such as a composite material or a durable plastic, without deviating from the scope of the present invention. It is intended for the hollow structural members 28, 30 and 32 to have sufficient strength to bear a load (e.g., a plurality of row units 62) interconnected thereto, as hereinafter described.

Figure 2:
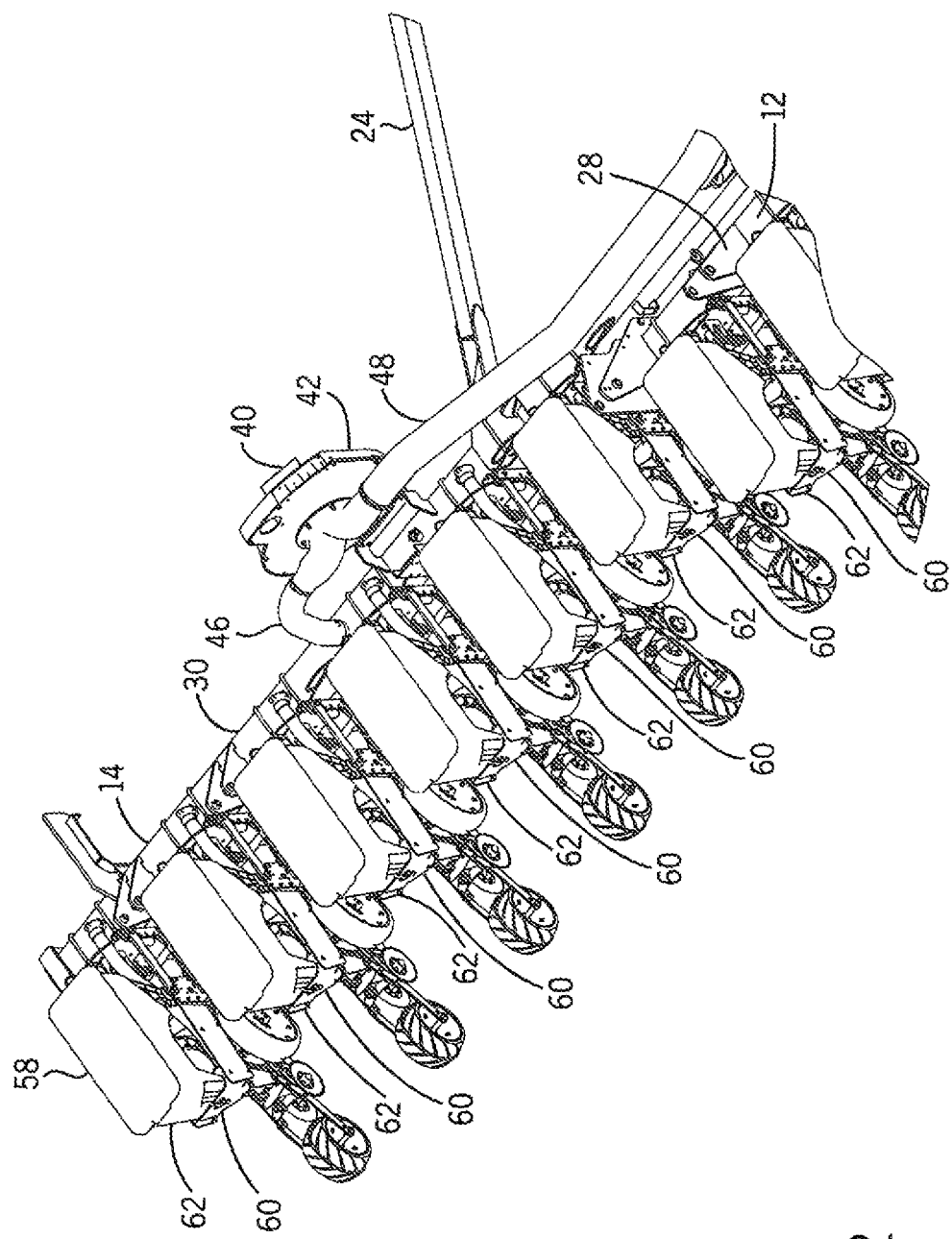
FIG. 2 is an enlarged, an isometric view showing a portion of the agricultural seed planter of FIG. 1.

As best seen in FIGS. 1-2, a motor 40 and a blower or fan 42 may be mounted to any of the structural members 28, 30, and 32. By way of example, the motor 40 and fan 42 are mounted on structural member 30 of the left section 14.

Motor 40 may be a hydraulic motor coupled to a hydraulic reservoir and used to drive the fan 42. Alternatively, motor 40 may take the form of an electric motor, a combustion engine, or the like without deviating from the scope of the present invention. Likewise, fan 42 may take the form of an axial fan, a blower-type fan, a plurality of parallel fans, a plurality of sequential fans, a turbine-type fan, or a combination thereof without deviating from the scope of the present invention.

A conduit system or flexible tubing system generally designated by the reference numeral 45 is used to pneumatically couple the fan 42 to the hollow structural members 28, 30, and 32, for reasons hereinafter described. More specifically, flexible tubing system 45 includes a first conduit 46 coupling the fan 42 to the hollow structural member 30 of the left section 14 and a second conduit 48 coupling the fan 42 to the middle section 12 and the right section 16. Second conduit 48 connects to a junction 56 which is attached to the middle section 12 via third conduit 50 to pneumatically couple the middle section 12 to the fan 42. The junction 56 is pneumatically coupled the hollow structural member 32 of the right section 16 by fourth conduit 52. By pneumatically coupling the fan 42 to the hollow structural members 28, 30, and 32, as heretofore described, the fan 42 is enabled to pass a forced airflow through each hollow structural member 28, 30, and 32. Further, this forced air flow may create either a pressure increase or a pressure drop (e.g., a vacuum) in the hollow structural members 28, 30, 32 and the conduits 46, 48, 50, 52 depending on the direction of the forced air flow created by the fan 42, for reasons hereinafter described.

A plurality of row units 62 are interconnected to middle section 12, left section 14, and right section 16 and extend rearwardly therefrom. In the depicted embodiment, the agricultural seed planter 10 includes sixteen row units 62. By way of example, the middle section 12 is shown as having four row units 62 projecting therefrom, the left section 12 is shown as having six row units 62 projecting therefrom, and the right section 14 is shown as having six row units projecting therefrom. It can be appreciated that the agricultural seed planter 10 may include any number of row units 62 without deviating from the scope of the present invention.

Figure 3:
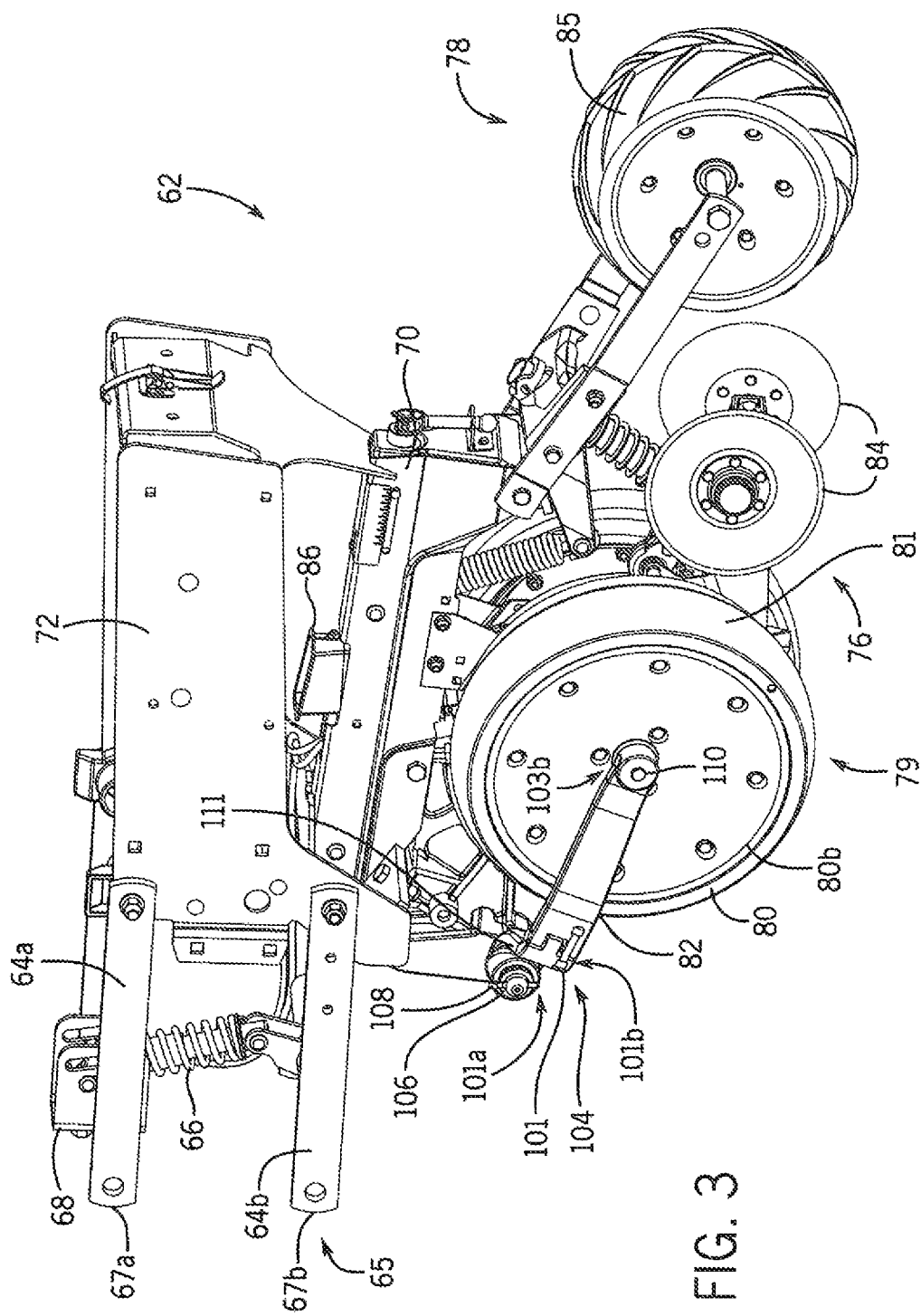
FIG. 3 is an isometric view of a row unit of the agricultural seed planter of FIG. 1 showing the gauge wheel assembly of the present invention in an operating position.
Figure 4:
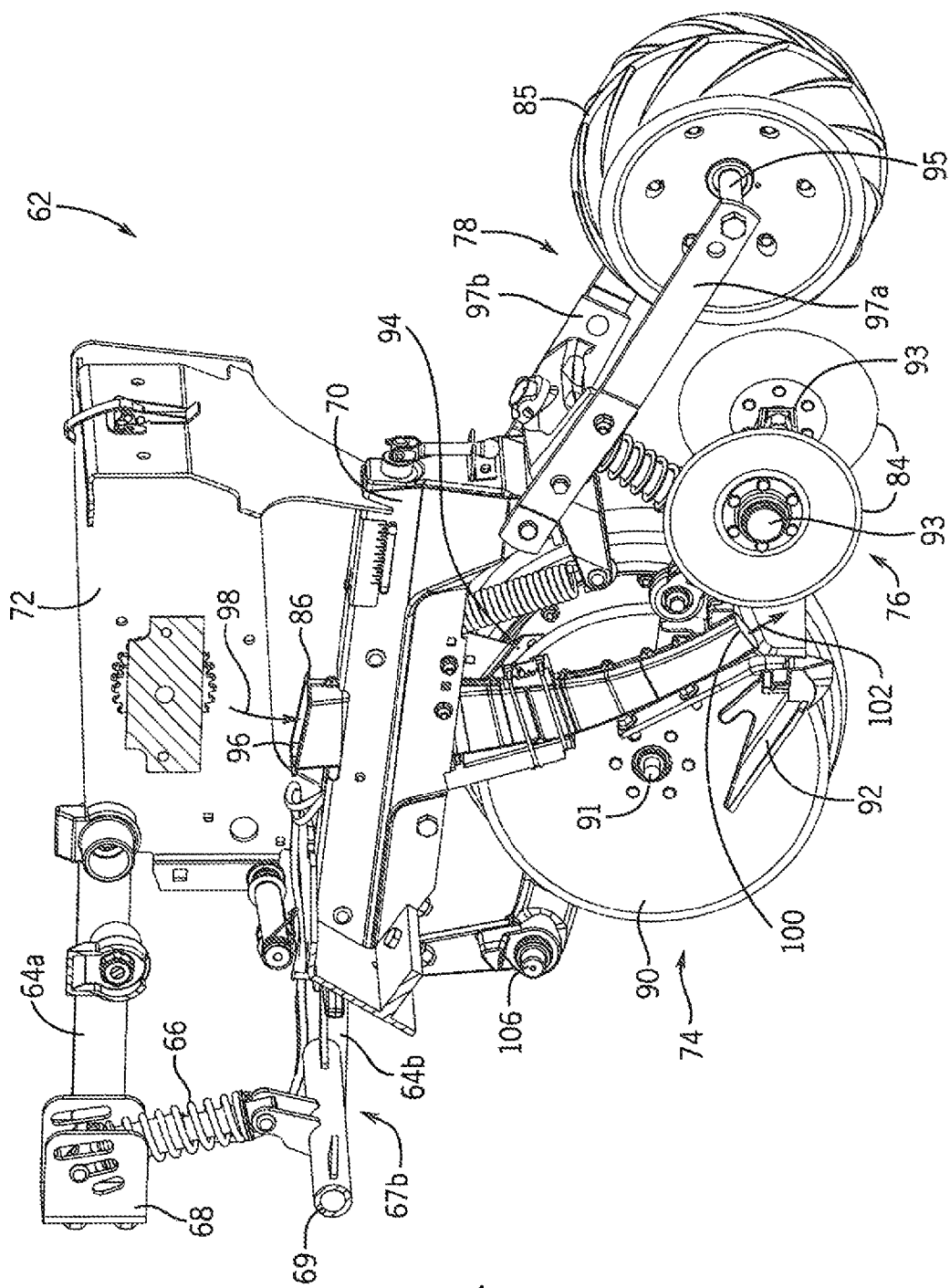
FIG. 4 is an isometric view of a row unit of the agricultural seed planter, similar to FIG. 3, with the gauge wheel assembly of the present invention removed.

As best seen in FIG. 3, each row unit 62 includes a chassis 70 having a frame 72 supported thereon. The chassis 70 and the frame 72 are configured to support various elements of the row unit 62. For example, each frame 72 may support a corresponding a seed hopper 58, FIG. 2, used to store and supply the seed for a seeding operation and the seed metering system for metering the seeds to be planted.

Upper elements 64a and lower elements 64b of parallel linkage assembly 65 are pivotably connected to and project forwardly from the frame 72. The terminal ends 67a and 67b of the upper and lower elements 64a and 64b, respectively, of parallel linkage assembly 65 are pivotably connected to a corresponding one of the middle section 12, left section 14, and right section 16 of the agricultural seed planter 10. It can be appreciated that the parallel linkage assembly 65 allows for limited vertical movement of the row unit 62. It is contemplated to provide a biasing member 66 between a mounting bracket 68 connectable to a corresponding one of the middle section 12, left section 14, and right section 16 of the agricultural seed planter 10 and a support bar 69 extending between and interconnecting the lower elements 64b of the parallel linkage assembly 65 to establish a contact force between the row unit 62 and the soil. The biasing member 66 is adjustable to vary the contact force based on field conditions, e.g., hard or soft soil conditions.

The chassis 70 supports a coulter assembly 74, a soil closing assembly 76, and a packer assembly 78. The coulter assembly 74 includes a trench opener disk 90 rotatably supported on a central hub 91, which in turn, is operatively connected to the chassis 70. As the row unit 62 travels across a field, it is intended for the trench opener disk 90 to rotate on hub 91 so as to cut a trench or furrow in the soil for receiving seeds. The coulter assembly 74 further includes a firming point 92 positioned adjacent and readwardly of the trench opener disk 90. It is intended for firming point 92 to engage and firm the loose soil in the bottom of the trench cut by the trench opener disk 90 in order to provide a trench having a consistent v-shaped for receiving the seed to be deposited there. A scraper 94 is disposed adjacent to the trench opener disk 90 and configured scrap off the accumulated soil from the rotating, trench opener disk 90 as the trench opener disk 90 cuts the trench.

Closing disks 84 of the closing assembly 76 are rotatably supported on corresponding hubs 93 which, in turn, are operatively connected to the chassis 70 such that closing disks 84 are positioned rearwardly of trench opener disk 90. As is conventional, as the row unit 62 travels across a field, it is intended for the closing disks 84 rotate on hubs 93 so as to push the soil excavated by the trench disk opener 90 back into the trench and cover the seeds deposited in the trench with soil. Packer wheel 85 of the packer assembly 78 is rotatably supported on axle 95 which, in turn, is operatively connected to the chassis 70 by supports 97a and 97b such that the packer wheel 85 is positioned rearwardly of the closing disks 84. As the row unit 62 travels across a field, it is intended for the packer wheel 84 to rotate on axle 95 and travel over the trench filled with soil by the closing disks 84 so as to pack the soil covering the seeds deposited therein. It can be appreciated that by employing multiple row units 62 distributed along the middle section 12, the left section 14, and the right section 16 of agricultural planter 10, FIG. 1, multiple rows of seeds may be simultaneously planted within the field.

As heretofore described, each row unit 62 includes a seed hopper 58 used to store and supply the seed for a seeding operation and a metering system (not shown) for dispensing the seed from the seed hopper 58 into the inlet 96 of seed tube 86. More specifically, the metering system is in pneumatic communication with at least one of the hollow structural members 28, 30, and 32 so as to create a pressure change in the metering system. The pressure change in the metering system is utilized to transfer the seeds received from the seed hopper 58 to the inlet 96 of the seed tube 86. The seeds received at the inlet 96 of seed tube 86 flow through the seed tube 86 in a direction 98 and exit an outlet 100 of the seed tube 86 in a direction 102. The outlet 100 of the seed tube 86 is positioned rearwardly of trench opener disc 90. As such, as the row unit 62 travels across a field, the seeds exiting outlet 100 of seed tube 86 are deposited within the freshly excavated trench formed by trench opener disc 90.

A gauge wheel assembly 79 includes rotatable gauge wheel 80 pivotably coupled to the chassis 70 by a foldable arm 82. The gauge wheel 80 is rotatably supported on stub axle 110 and includes a radially outer surface 81 engageable with the field to establish a desired trench depth for seed deposition into the soil, as is conventional. The gauge wheel 80 further includes an inner surface 80a directed at trench opener disk 90 and an outer surface 80b.

The foldable arm 82 includes a first portion 101 having first and second opposite ends 101a and 101b, respectively. The first end 101a of the first portion 101 of the foldable arm 82 includes an opening positioned over a shaft 106 of the chassis 70. A cotter key or split pin 108 extends through a hole in the shaft 106 and is bent in a conventional manner to maintain the first end 101a of the first portion 101 of the foldable arm 82 on shaft 106. In the depicted embodiment, the second end 101b of the first portion 101 of the foldable arm 82 is laterally spaced from the first end 101a of the first portion 101 of the foldable arm 82 and is positioned adjacent outer surface 80b of gauge wheel 80. The first portion 101 of the foldable arm 82 includes a linear section 109, FIGS. 5A-5B, extending along an axis and a bend 111 disposed between the first and second ends 101a and 101b, respectively, thereof which as allows for first portion 101 of foldable arm 82 to extend around outer surface 81 of gauge wheel 80. It can be appreciated that the first portion 101 of the foldable arm 82 may be attached to the chassis 70 by other means known in the art, such as directly welding the arm 82 to the shaft 106 or by using a fastener without deviating from the scope of the present invention.

The second end 101b of the first portion 101 of the foldable arm 82 is pivotably connected to a first end 103a of a second portion 103 of the foldable arm 82 by a hinge 112 of a hinge assembly 104, as hereinafter described, FIGS. 5A-5B. Second portion 103 includes a linear section 113 that extends along an axis and a second end 103b having an opening positioned over an end of stub axle 110. By way of example, a cotter key or a split pin extends through a hole in the stub axle 110 and is bent in a conventional manner to maintain the second end 103b of the second portion 103 of the foldable arm 82 on stub axle 110. It is noted that second portion 103 of foldable arm 82 has a slight bend therein such that the second end 103b of the second portion 103 of the foldable arm 82 lies in a plane generally parallel to a vertical plane bisecting gauge wheel 80. It can be appreciated that the second portion 103 of the foldable arm 82 may be attached to the stub axle 110 by other means known in the art, without deviating from the scope of the present invention.

Figure 5A:
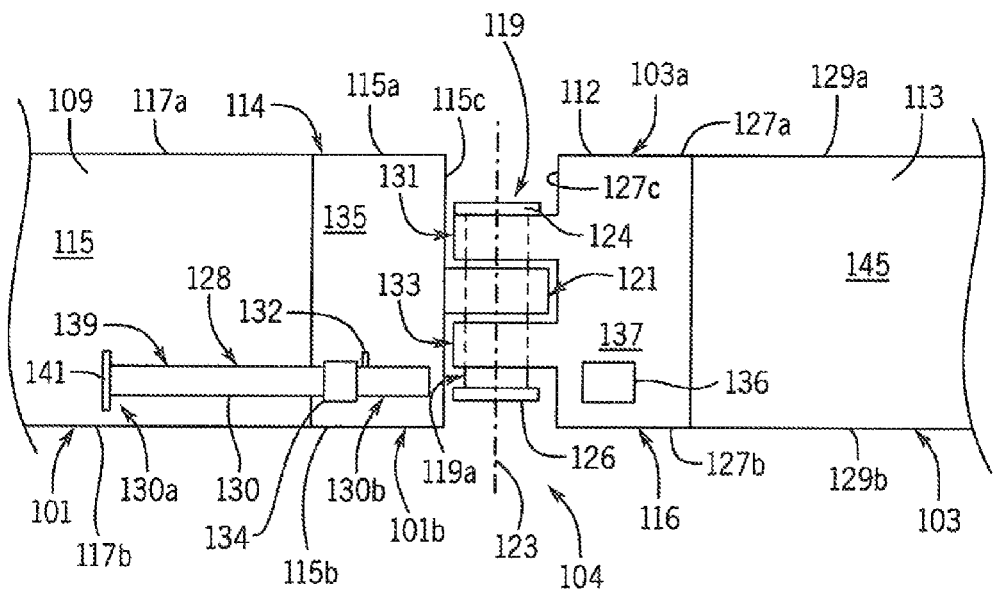
FIG. 5A is a schematic view of a hinge and lock bolt combination for the gauge wheel assembly of the present invention, with the lock bolt in an unlocked position.
Figure 5B:
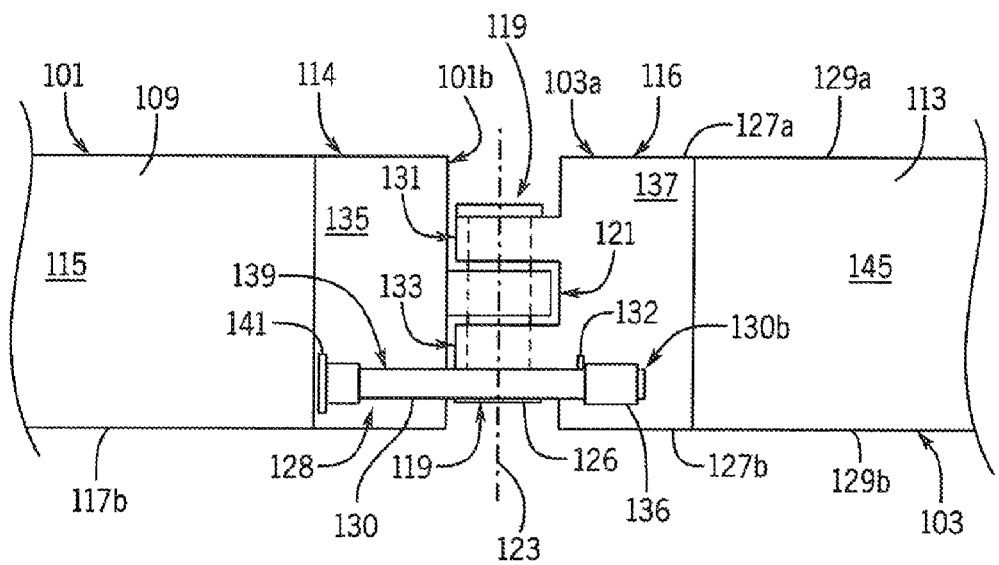
FIG. 5B is a schematic view, similar to FIG. 5A, showing the lock bolt of the hinge and lock bolt combination in an unlocked position.

Referring specifically to FIGS. 5A-5B, as previously noted, the second end 10b of the first portion 101 of the foldable arm 82 is pivotably connected to a first end 103a of a second portion 103 of the foldable arm 82 by the hinge 112 of the hinge assembly 104. The hinge 112 includes a first hinge plate 114 having a first side bonded in any conventional matter (e.g. welding or the like) to outer surface 115 of the first portion 101 of foldable arm 82 at a location adjacent the second end 101b thereof. Alternatively, the first hinge plate 114 may be integrally formed with the first portion 101 of the foldable arm 82, without deviating from the scope of the present invention. First hinge plate 114 includes an upper edge 115a generally coplanar with the upper edge 117a of the first portion 101 of foldable arm 82; a lower edge 115b generally coplanar with the lower edge 117b of the first portion 101 of foldable arm 82; and a distal edge 115c generally coplanar with the terminal edge (not shown) of the first portion 101 of foldable arm 82. A knuckle 121 projects rearwardly from the distal edge 115c of the first hinge plate 114. Knuckle 121 includes a passageway therethrough extending along an axis 123 which is generally perpendicular to the linear section 109 of the first portion 101 of the foldable arm 82. The passageway through the knuckle 121 is adapted for receiving a pivot pin 119 therethrough, as hereinafter described.

The hinge 112 further includes a second hinge plate 116 having a first side bonded in any conventional matter (e.g. welding or the like) to outer surface 145 of the second portion 103 of foldable arm 82 at a location adjacent the first end 103a thereof. Alternatively, the second hinge plate 116 may be integrally formed with the second portion 103 of the foldable arm 82, without deviating from the scope of the present invention. Second hinge plate 116 includes an upper edge 127a generally coplanar with the upper edge 129a of the second portion 103 of foldable arm 82; a lower edge 127b generally coplanar with the lower edge 129b of the second portion 103 of foldable arm 82; and a leading edge 127c generally coplanar with the leading edge (not shown) of the second portion 103 of foldable arm 82. First and second spaced knuckles 131 and 131, respectively, project forwardly from the leading edge 127c of the second hinge plate 116. The first and second knuckle 131 and 133, respectively, include corresponding passageways therethrough which extending along the axis 123 which is generally perpendicular to the linear section 113 of the second portion 103 of the foldable arm 82. The passageways through the first and second knuckles 131 and 133, respectively, are adapted for receiving the pivot pin 119 therethrough, as hereinafter described.

The first and second portions 101 and 103, respectively, are pivotably connected by assembling hinge 112, as hereinafter described. More specifically, the knuckle 121 of the first hinge plate 114 is inserted between the first and second knuckles 131 and 133, respectively, of the second hinge plate 116 such that passageway through the knuckle 121 of the first hinge plate 114 is axially aligned with the passageways through the first and second knuckles 131 and 133, respectively, of the second hinge plate 116. The pivot pin 119 is inserted downwardly into the passageway through the knuckle 121 of the first hinge plate 114 and the passageways through the first and second knuckles 131 and 133, respectively, of the second hinge plate 116 until such point as the head 124 of the pivot pin 119 engages the first knuckle 131 of the second hinge plate 116, thereby capturing the first and second hinge plates 114 and 116, respectively, (and hence, first and second portions 101 and 103, respectively, of foldable arm 82) on pivot pin 119. It can be appreciated that the head 124 has a diameter greater than the diameter of the passageway through the knuckle 131 of the second hinge plate 116 so as to not pass therethrough.

It is contemplated for the pivot pin 119 to be of sufficient length such that terminal end 119a of pivot pin 119 extends completely through and projects from the knuckle 133 of the second hinge plate 116 with pivot pin 119 fully inserted into the passageway through the knuckle 121 of the first hinge plate 114 and the passageways through the first and second knuckles 131 and 133, respectively, of the second hinge plate 116, as heretofore described. A securing element such as cap 126, a clevis pin, cotter pin, nut and bolt, or clips may be secured to terminal end 119a of pivot pin 119 to maintain pivot pin 119 within the passageway through the knuckle 121 of the first hinge plate 114 and the passageways through the first and second knuckles 131 and 133, respectively, of the second hinge plate 116.

Figure 6:
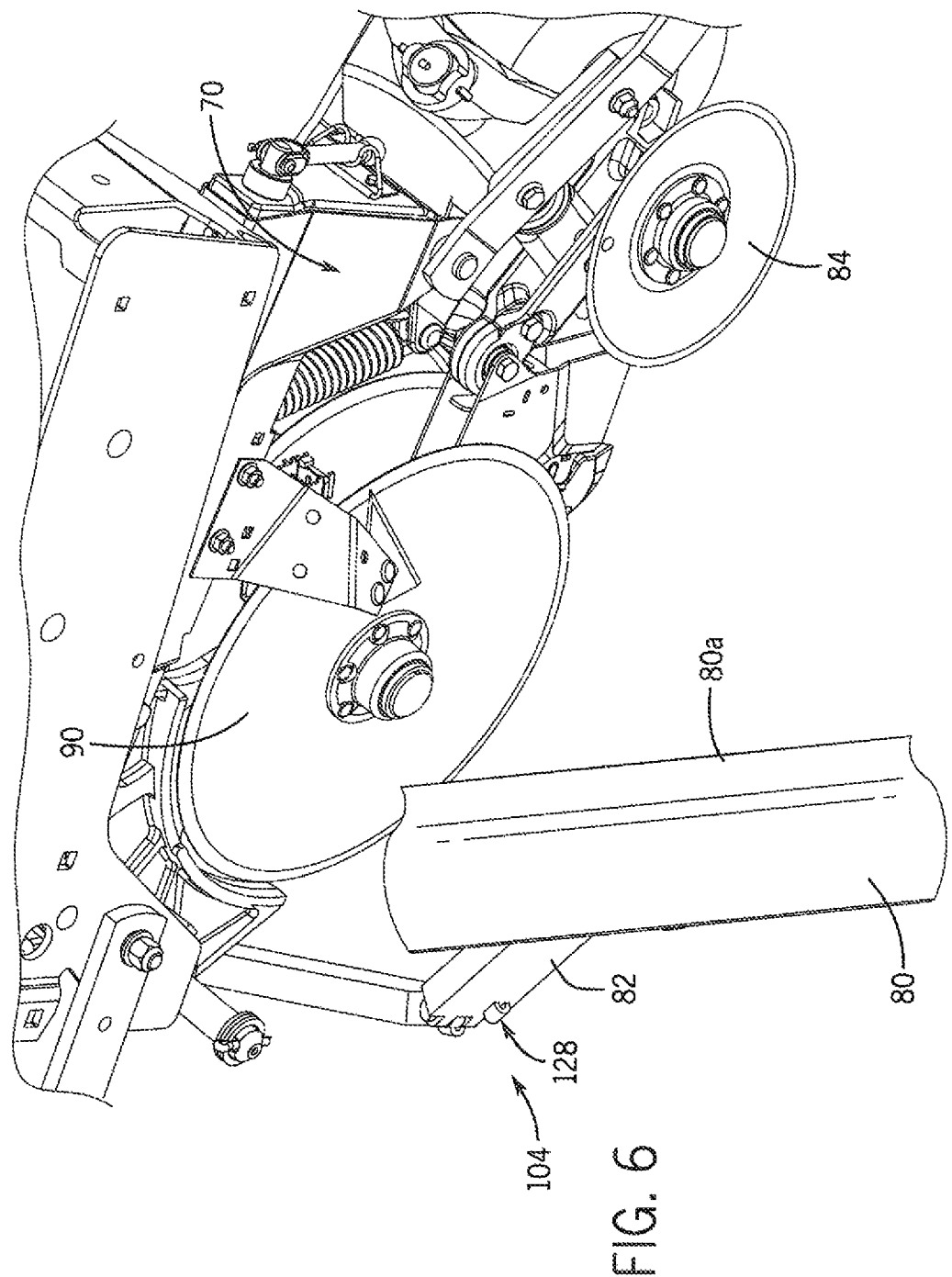
FIG. 6 is an isometric view of a row unit of the agricultural seed planter of FIG. 1 showing the gauge wheel assembly of the present invention in an open, non-operating position.

It can be appreciated that with pivot pin 119 inserted through the passageway in the knuckle 121 of the first hinge plate 114 and the passageways in the first and second knuckles 131 and 133, respectively, of the second hinge plate 116, the first and second hinge plates 114 and 116, respectively, and hence, the first and second portions 101 and 103, respectively, are pivotably connected. As such, the second portion 103 of foldable arm 82 may be pivoted with respect to the first portion 101 of the foldable arm 82 on the pivot pin 119 between a first operating position, FIG. 3 wherein the first and second hinge plates 114 and 116, respectively, lie in a common plane and the linear section 109 of first portion 101 is generally coplanar with the linear section 113 of second portion, and a second non-operating position, FIG. 6, wherein the first hinge plane is at an angle of less than 180 degrees, e.g., less than 90 degrees, to the second hinge plate 116 and the linear section 109 of first portion 101 is at an angle of less than 180 degrees, e.g., less than 90 degrees, to the linear section 113 of second portion. Hence, it can be understood that as the second portion 103 of the foldable arm 82 is pivoted to the non-operating position, the gauge wheel 80 interconnected to the second end 103b of second portion 103 of foldable arm 82 is pivoted away from coulter assembly 74 so as to allow a user access thereto to for servicing the coulter assembly 74 and/or clearing any unwanted residue from therefrom, without removing the gauge wheel 80 entirely from row unit 62.

The hinge assembly 104 may also include a locking mechanism 128 for maintaining the second portion 103 of foldable arm 82, and hence gauge wheel 80, in the operating position, FIG. 3. By way of example, the locking mechanism 128 may take the form of a surface bolt lock having a first sleeve 134 projecting from the outer, second side 135 of the first hinge plate 114 and a second sleeve 136 projecting from the outer, second side 137 of the second hinge plate 116. The first sleeve 134 and the second sleeve 136 define passages for slidably receiving a lock bolt 139 therethrough. The lock bolt 139 includes a generally cylindrical bolt portion 130 having first and second ends 130a and 130b, respectively. Bolt portion 130 of lock bolt 139 includes a stop 141 adjacent the first end 130a thereof and a handle 132 spaced from the stop 141 and projecting radially from the bolt portion. The stop 141 and the handle 132 are disposed on opposite sides of the first sleeve 134 so as to retain the lock bolt 139 on the first hinge plate 114.

In operation, the lock bolt 139 is moveable between a retracted position, FIG. 5A, wherein the second end 130b of the bolt portion 130 is disengaged and spaced from the second sleeve 136 and an engaged position, FIG. 5B, wherein the second end 130b of the bolt portion 130 extends through the passage defined by the second sleeve 136. The handle 132 of the lock bolt 139 facilitates movement of the bolt portion 130 between the retracted and engaged positions. It can be appreciated that when the bolt portion 130 is in a retracted position, the second end 130b of the bolt portion 130 is spaced from the second hinge plate 116 and does not impede movement of the second portion 103 of the foldable arm 82 between the operating and non-operating positions. Alternatively, with bolt portion 130 in the engaged position, the bolt portion 130 interconnects the first and second hinge plates 114 and 116, respectively, and prevents movement of the second portion 103 of the foldable arm 82 between from the operating position, FIG. 3, thereby locking the second portion 103 of the foldable arm 82, and hence gauge wheel 80, in its operating position. It is contemplated for locking mechanism 128 to include a latching element (not shown) to maintain bolt portion 130 in the engaged position or to bias bolt portion 130 into the engaged position, without deviating from the scope of the present invention. Further, it is understood that various alternative locking mechanisms may be utilized to maintain or lock the second portion 103 of the foldable arm 82, and hence gauge wheel 80, in its operating position, without deviating from the scope of the present invention.

In operation, the second portion 103 of the foldable arm 82, and hence gauge wheel 80, is moved to its operating position, FIG. 3, and maintained therein by locking mechanism 128. In order allow a user access to the coulter assembly 74 for the servicing and/or clearing away of any unwanted residue therefrom, it is contemplated to move the bolt portion 130 of the locking mechanism 128 to its retracted position, FIG. 5A, so as to allow the second portion 103 of the foldable arm 82 to be pivoted from its operating position to its non-operating position, FIG. 6. With the second portion 103 of the foldable arm 82, and hence gauge wheel 80, in its non-operating position, the trench opener disk 90 and other internal components of the coulter assembly 74 are exposed for maintenance and repair. Upon completion of the desired maintenance and/or repair, the second portion 103 of the foldable arm 82 is pivoted to its operating position and the bolt portion 130 of the locking mechanism 128 is returned to its engaged position, FIG. 5B, thereby interconnecting the first and second hinge plates 114 and 116, respectively, and preventing movement of the second portion 103 of the foldable arm 82 (and hence, gauge wheel 80) from the operating position, FIG. 3.

Many changes and modifications could be made to the invention without departing from the spirit thereof. The scope of these changes will become apparent from the appended claims.

I claim:

1. A gauge wheel assembly for an agricultural apparatus, comprising:
   a gauge wheel arm including:
      a first portion having a first end coupled to the agricultural apparatus and a second end; and
      a second portion having first and second ends;
   a gauge wheel rotatably supported on and coupled to the gauge wheel arm;
   a hinge interconnecting the second end of the first portion of the gauge wheel arm to the first end of the second portion of the gauge wheel arm;
   wherein the second portion of the gauge wheel arm is pivotable about a generally vertical axis on the hinge between a first position wherein the first and second portions of the gauge wheel arm extend along a common, generally horizontal axis and a second position wherein the second portion of the gauge wheel arm extends along an axis at an angle to the common axis; and
   a lock bolt assembly having a first end operatively connected to the second end of the first portion of the gauge wheel arm and a second end operatively connected to the first end of the second portion of the gauge wheel arm, the lock bolt assembly including a lock bolt linearly movable along the generally horizontal axis between an unlocked position wherein the second portion of the gauge wheel arm is movable between the first and second positions, and a locked position wherein the lock bolt maintains the second portion of the gauge wheel arm in the first position.

2. The assembly of claim 1 wherein the hinge includes:
   a first hinge plate interconnected to the second end of the first portion of the gauge wheel arm;
   a second hinge plate interconnected to the first end of the second portion of the gauge wheel arm; and
   a pivot pin pivotably connecting the first and second hinge plates.

3. The assembly of claim 2 wherein the first hinge plate includes a hinge passage and the second hinge plate includes a hinge passage, the pivot pin extending through the hinge passages of the first and second hinge plates.

4. The assembly of claim 2 wherein the pivot pin extends along a pivot axis generally perpendicular to the common axis.

5. The assembly of claim 1 wherein the angle is greater than 0 degrees and less than 180 degrees.

6. The assembly of claim 1 wherein the angle is greater than 0 degrees and less than or equal to 90 degrees.

7. A gauge wheel assembly of an agricultural apparatus, comprising:
- a foldable arm having a first end operatively connected to the agricultural apparatus and a second end, the arm being foldable about a generally vertical fold axis between a non-folded position wherein the arm extends along a generally horizontal arm axis and a folded position wherein a first portion of the arm is at an angle less than 180 degrees to a second portion of the arm;
- a gauge wheel rotatably mounted to the second end of the arm; and
- a lock bolt assembly having a first end operatively connected to the first portion of the arm and a second end operatively connected to the second portion of the arm, the lock bolt assembly including a lock bolt linearly movable along the generally horizontal arm axis between an unlocked position wherein the arm is movable between the non-folded and folded positions, and a locked position wherein the lock bolt maintains the arm in the non-folded position.

8. The assembly of claim 7 further comprising a hinge interconnecting the first and second portions of the arm.

9. The assembly of claim 8 wherein the hinge includes:
- a first hinge plate operatively connected to the first portion of the arm;
- a second hinge plate operatively connected to the second portion of the arm; and
- a pin pivotably coupling the first and second hinge plates, the pivot pin extending along the fold axis.

10. The assembly of claim 7 wherein the angle is less than 90 degrees.

11. A gauge wheel assembly for an agricultural apparatus, comprising:
- a gauge wheel arm extending along an axis and including a first end operatively connected to the agricultural apparatus and a second end; and
- a gauge wheel pivotably connected to the gauge wheel arm, the gauge wheel movable between a first position adjacent the agricultural apparatus and a second position wherein the gauge wheel is spaced from the agricultural apparatus; and
- a lock bolt assembly having a first end operatively connected to a first portion of the gauge wheel arm and a second end operatively connected to the second portion of the gauge wheel arm, the lock bolt assembly including a lock bolt for maintaining the gauge wheel in the first position;

wherein:
- in the first position, the gauge wheel lies in a plane parallel to the axis of the gauge wheel arm and in the second position, the plane of the gauge wheel is at an angle of less than 180 degrees to the axis; and
- the lock bolt is linearly movable along the axis of the gauge wheel arm between an unlocked position wherein the gauge wheel arm is movable between the first and second positions, and a locked position wherein the lock bolt maintains the arm in the first position.

12. The assembly of claim 11 further comprising a pivotable arm having a first end pivotably coupled to the second end of the gauge wheel arm, the pivotable arm rotatably supporting the gauge wheel.

13. The assembly of claim 12 wherein the first end of the pivotable arm is pivotably coupled to the second end of the gauge wheel arm by a hinge.

14. The assembly of claim 13 wherein the hinge includes:
- a first hinge plate operatively connected to the second end of the gauge wheel arm;
- a second hinge plate operatively connected to first end of the pivotable arm; and
- a pivot pin pivotably coupling the first and second hinge plates.

15. The assembly of claim 14 wherein the pivot pin is generally parallel to a plane through which the gauge wheel arm extends.

* * * * *